US012780449B2

(12) United States Patent
Jackson

(10) Patent No.: US 12,780,449 B2
(45) Date of Patent: Nov. 3, 2026

(54) BOOM DEPLOYER FOR IN ORBIT DEPLOYMENT OF SATELLITE STRUCTURES, ANTENNAS, AND SENSORS

(71) Applicant: Flexitech LLC, Orlando, FL (US)

(72) Inventor: Kevin Jackson, Orlando, FL (US)

(73) Assignee: FLEXITECH, LLC, Orlando, FL (US)

( * ) Notice: Subject to any disclaimer, the term of this patent is extended or adjusted under 35 U.S.C. 154(b) by 21 days.

(21) Appl. No.: 19/025,413

(22) Filed: Jan. 16, 2025

(65) Prior Publication Data

US 2025/0229914 A1 Jul. 17, 2025

Related U.S. Application Data

(60) Provisional application No. 63/621,340, filed on Jan. 16, 2024.

(51) Int. Cl.
*B64G 1/22* (2006.01)
*B64G 1/66* (2006.01)

(52) U.S. Cl.
CPC .............. *B64G 1/2225* (2023.08); *B64G 1/66* (2013.01)

(58) Field of Classification Search
CPC ...... B64G 1/2225; B64G 1/66; B64G 1/2229; H01Q 1/288; H01Q 1/08; H01Q 1/1235; H01Q 11/086
See application file for complete search history.

(56) References Cited

U.S. PATENT DOCUMENTS 4,866,893 A * 9/1989 McGinnis ............... E04H 12/18 52/745.18
7,694,465 B2 4/2010 Pryor
8,893,442 B1 11/2014 Spence et al.
8,970,447 B2 3/2015 Ochao et al.
10,059,471 B2 8/2018 Steele et al.
10,347,974 B1 7/2019 Palmer et al.
10,367,246 B2 7/2019 Rudys et al.
10,611,502 B2 4/2020 Hensley et al.
11,292,616 B2 * 4/2022 Hensley ............... B64G 1/2225
2019/0103650 A1 * 4/2019 Daton-Lovett .......... H01Q 1/40
2022/0042309 A1 * 2/2022 Turse ................... B64G 1/2225
2022/0267029 A1 * 8/2022 Murphey ................ E04C 3/005

FOREIGN PATENT DOCUMENTS

CA 3070985 A1 * 1/2019 ............. H02K 11/20

* cited by examiner

*Primary Examiner* — Valentina Xavier
(74) *Attorney, Agent, or Firm* — John L. DeAngelis; Wolter Van Dyke Davis, PLLC

(57) ABSTRACT

A deployer for storing and deploying a boom from a satellite, with antennas and sensors attached to the boom. The deployer includes a motor disposed within a drum and a motor shaft coupled to the drum for rotating the drum. The drum has a circular cross section and the boom, stowed in a stowed cross-sectional configuration, is wrapped around the drum with a first end of the boom attached to the drum. As the drum rotates, the boom is deployed. A tensioning mechanism applies radially inward directed forces on the folded and wrapped boom while the motor rotates the drum for deploying the boom. A microprocessor responsive to a plurality of sensors controls boom deployment.

18 Claims, 7 Drawing Sheets

BOOM DEPLOYER FOR IN ORBIT DEPLOYMENT OF SATELLITE STRUCTURES, ANTENNAS, AND SENSORS

CROSS REFERENCE TO RELATED APPLICATIONS

The present application claims priority under 35 U.S.C. 119 (e) to the provisional patent application filed on Jan. 16, 2024 and assigned application No. 63/621,340. The provisional application is incorporated herein.

BACKGROUND OF THE INVENTION

Satellites require facilities to send and receive radio communications that provide critical command and control signals to and from the spacecraft while in orbit. Additional radio communications receivers and transmitters support the satellite's mission to provide a communications link to and from the ground stations, to and from other spacecraft, and to and from space-based and ground-based sensors. Many of the antennas needed for these applications are large structures comprising one or multiple elements.

Many of the satellites developed today are relatively small, but require large antennas and sensors to support their mission. The antennas are too large for implementing as fixed structures on the satellite at launch. Instead, the antennas and sensors are attached to a boom, stowed at launch, and deployed while in orbit by operation of a motorized deployer mechanism (also referred to herein as a deployer).

DETAILED DESCRIPTION OF THE INVENTION

The present invention relates to a deployer that deploys a boom (and stows the boom prior to deployment). Once deployed, the boom supports attached antennas and sensors when in orbit. The inventive deployer provides the necessary mechanical, electrical, and electronic elements in one integrated design for stowing prior to deployment and for deploying the boom once on orbit. The mechanism for stowing, deploying, and guiding the boom is compact and lightweight and therefore suitable for use with small satellites.

To conveniently stow the boom and its attachments for launch and easily deploy the boom and its attachments to an extended configuration when in orbit, the boom comprises a length of semi-flexible composite or metal material with a C-shaped cross-section (similar to an extendable tape measure), a box-shaped cross-section (square or rectangle), or an oblong or oval shaped cross section.

Prior to deployment, the boom is stowed in a flat configuration and wound about a drum. As the boom is released from the wound condition and deployed, by action of a motorized deployer, the boom transitions to its intended final cross-sectional shape.

For example, a box-shaped boom is stowed in the deployer in a folded-flat configuration and transitions to a four-sided box cross sectional structure when deployed. Curvature of a deployed C-shaped boom is determined by boom length, boom material properties, and forces exerted on the deployed boom by the antennas and sensors attached to the boom. The curvature of the C-shaped curve when extended is further determined according to each application, i.e., the extended boom length and the mass and distance from the boom deployer of each antenna and sensor attached to the boom.

Similarly, dimensions and deploying characteristics of the box-shaped and oblong booms are also determined by the on-orbit loads and material properties of the boom.

Advantageously, the deployer of the present invention can deploy a boom supporting multiple sensors, antennas, etc. extending away from the satellite body when fully deployed.

The maximum boom length is determined by the specific application to accommodate factors including overall antenna or sensor length, spacecraft limitations, and clearance from the spacecraft.

Figure 1:
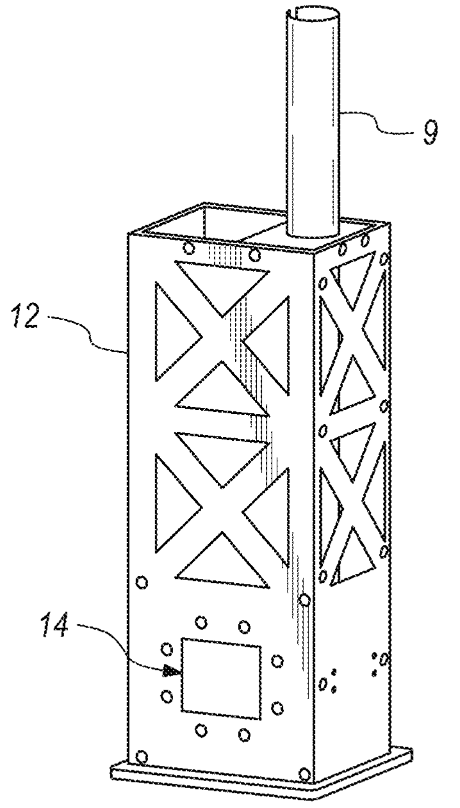
FIG. 1 illustrates a front view of a deployer and integrated control electronics according to the present invention.

FIG. 1 illustrates a boxed-shaped (having a square or rectangular cross-section) boom 9, a front view of a deployer 12, and an infra-red (IR) sensor board 14 comprising IR sensors, further described below, that monitor the boom deployment process.

Figure 2:
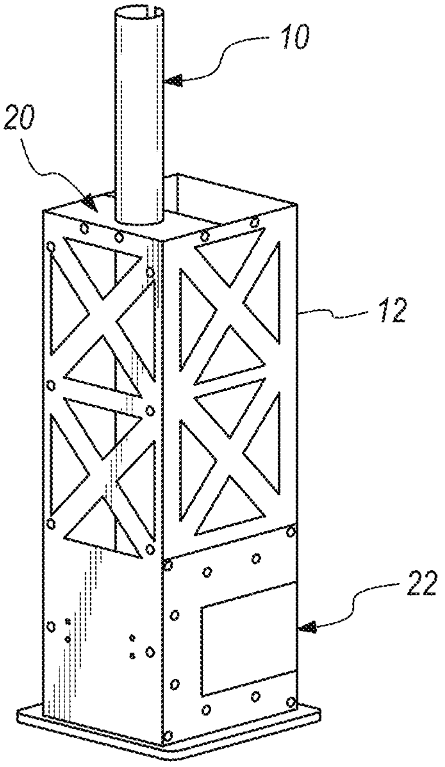
FIG. 2 illustrates a side view of a deployer and integrated control electronics according to the present invention.

FIG. 2 illustrates a rear view of the deployer 12, further including a transition guide 20, a deployer control board 22, and a C-shaped boom 10.

Figure 3:
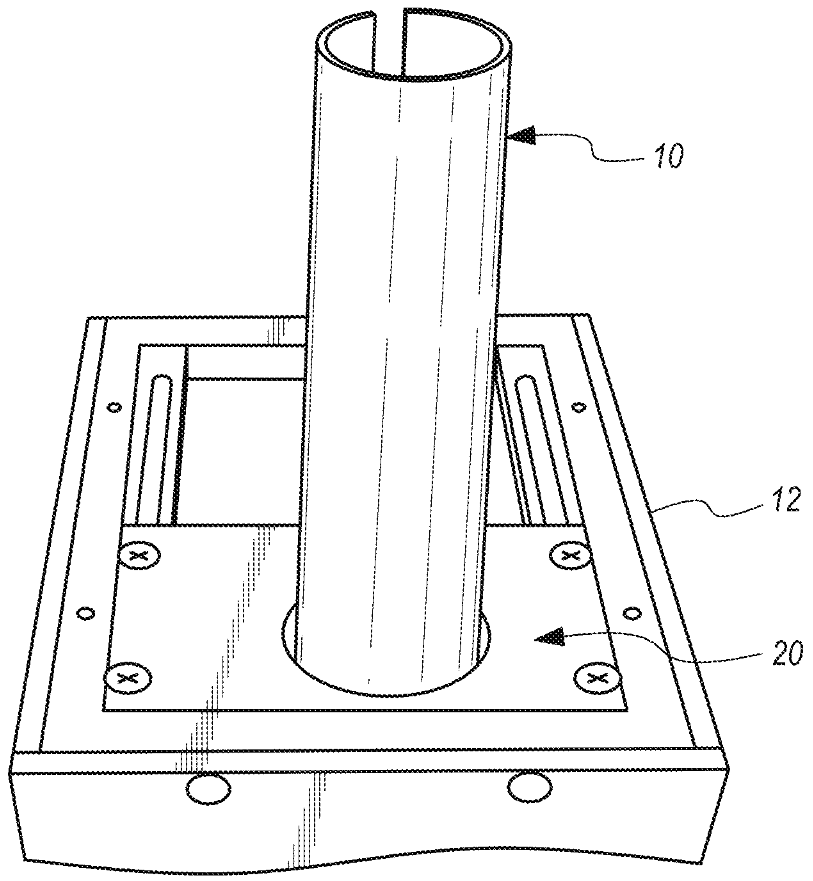
FIG. 3 illustrates a C-shaped boom emerging from a transition guide disposed on a deployer of the present invention.

The transition guide 20 is illustrated in the close-up view of FIG. 3, which depicts the C-shaped boom 10 emerging from the transition guide 20. The guide aids in transition of the boom from its stowed configuration to its deployed configuration.

The control board 22 includes various components for controlling operation of the deployer, as further described herein.

Components of the Deployer

Figure 4:
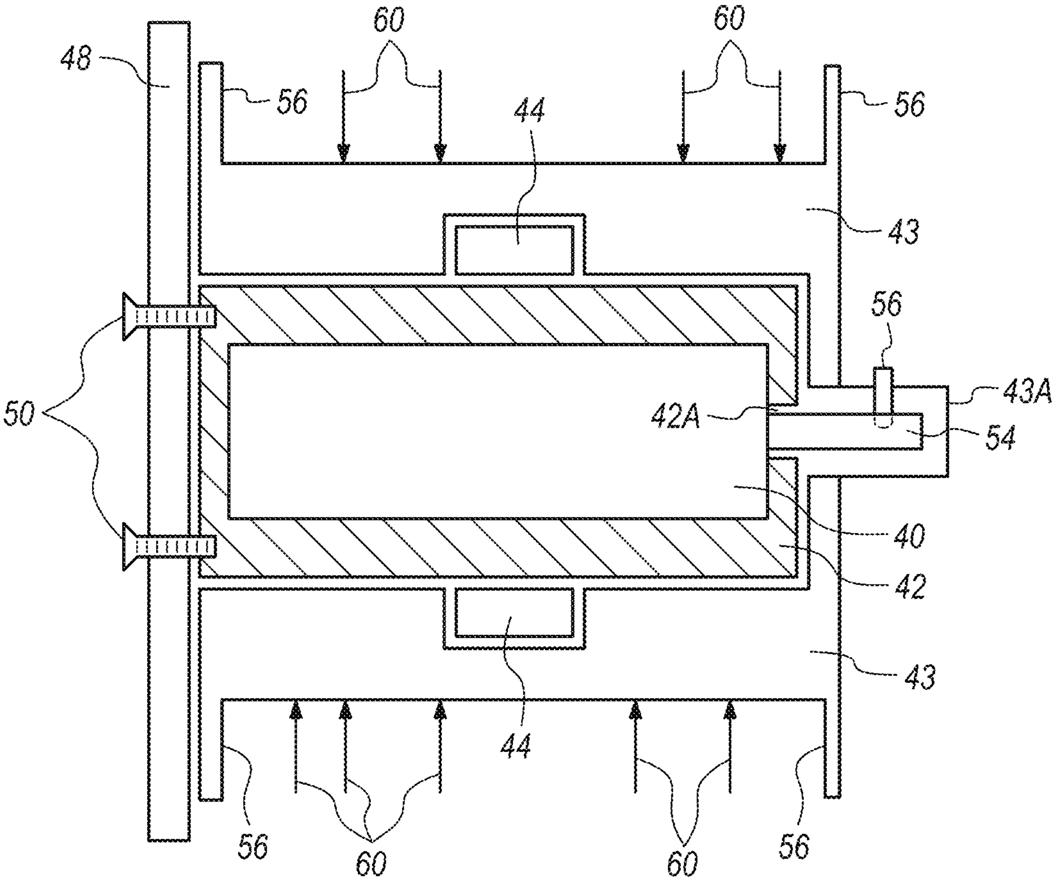
FIG. 4 illustrates a section view of certain elements of the deployer of the present invention.

As shown in the sectional view of FIG. 4, a motor 40 is disposed within and coupled to a motor sleeve 42; a rotating drum 43 surrounds the motor sleeve 42. A ring bearing 44 serves as an interface component between the sleeve 42 and a rotating drum 43, permitting the drum to freely rotate around the outside surface of the sleeve.

The sleeve 42 is fixed to a surface or wall 48 of the deployer enclosure using fasteners 50. Since the sleeve is rigidly mounted to the wall 48 and the motor is rigidly coupled to the sleeve, the motor is effectively rigidly mounted to the deployer enclosure.

A shaft 54 extending from the motor 40 passes through an opening 42A defined in the sleeve 42. The shaft is in turn coupled to a drum extension 43A with a fastener 56. Rotation of the motor thus causes rotation of the drum.

Drum end cheeks 57 extend from opposing edges of the drum 43. A distance between the end cheeks is determined by the stowed width of the boom.

The ring bearing 44 encircles the motor sleeve 42 and the drum rotates about the ring sleeve. That is, the drum does not contact the sleeve, but instead is rotated by rotation of the shaft 54 that is coupled to the drum 43. The ring bearing provides reduced-friction surface for rotation of the drum. A space qualified lubricant, such as Braycote Micronic 601 EF (available from Castrol Ltd. of Wayne, NY) may be used to further reduce bearing friction.

Configuration of the motor, sleeve and drum as illustrated in FIG. 4 provides a mechanism for controlling drum speed (and thereby speed at which the boom is deployed or retracted). Radially inward directed forces on the drum, such as indicated by arrowheads 60, prevent drum blooming.

Motor speed, which establishes the drum speed, cannot be changed during operation of the boom deployer. Instead, the preferred speed is established during testing and stored in controlling software before integration.

Figure 5:
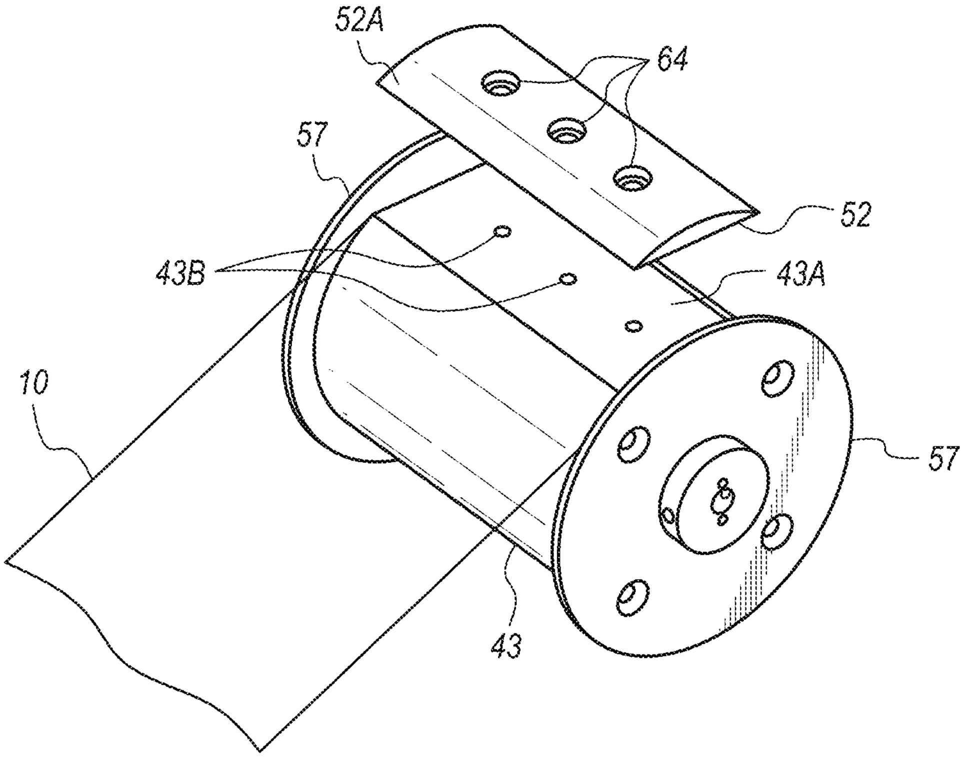
FIG. 5 illustrates a drum and a drum wedge around which a boom is wound.

The boom 10 is attached to the drum 43 as depicted in FIG. 5. One end of the folded boom 10 is captured between a drum wedge 52 (acting as a clamp) and the drum 43.

Figure 6:
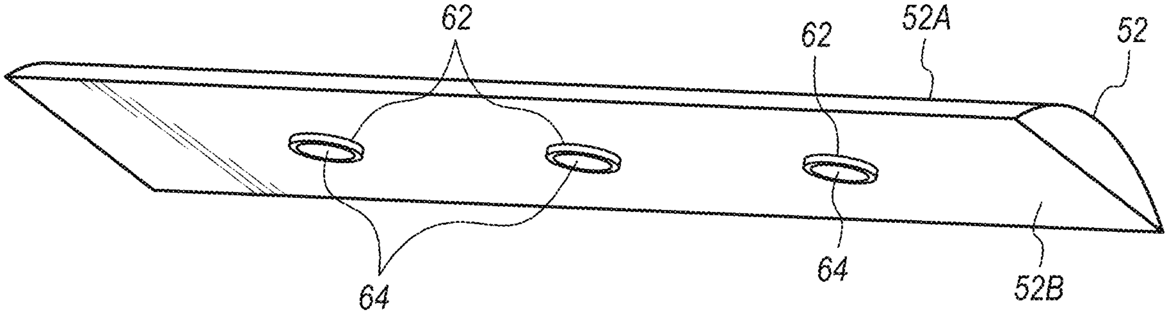
FIG. 6 further illustrates the drum wedge of FIG. 5.

Pillars 62 (see FIG. 6) surround each screw hole 64 in the drum wedge 62 and extend away from a surface 52A of the wedge 52. The length of each pillar exceeds the thickness of the folded boom, thereby permitting the boom to self-adjust as it rides vertically along the pillars during a deployment or stowing operation.

Each screw hole 64 (see FIG. 5) defines a screw head relief region. Mounting screws (not shown) are inserted within each screw hole 64 with the screw head resting in the screw head relief region such that an upper surface of the screw head is flush with a top surface 52A of the wedge 52. The boom is placed between a flat region 43A of the drum 43 and a bottom surface 52B of the wedge 52 (see FIG. 6). The mounting screws threadably engage with holes 43B in the drum flat surface 43A. This assembly of elements captures the boom 10 and attaches the boom securely to the drum.

The boom is rigidly attached to the drum, but allowed to "self-adjust" or rotate slightly, ensuring the boom is perpendicular relative to the rotational axis of the drum. The boom, when wound on the drum, sets flush with the circumference of the drum. When the deployer is in a stowed configuration, the wound boom does not extend beyond the circumference of the end cheeks.

The screw head relief places the mounting screws flush with the drum surface. Note also that the wedge shape is such that when affixed to the drum, the drum circumference is circular. A circular drum is desired for a smooth and even deployment operation.

With reference back to FIG. 4, as the motor 40 turns the drum 43, the stowed boom is pushed off the drum and out from the deployer 12 through the transition guide 20, as depicted in FIGS. 1, 2, and 3. The boom emerges from the deployer with a C-shaped cross-section, a box-shaped cross-section, or an oblong shaped cross-section.

Operation of the Deployer

With reference primarily to FIG. 4, as the drum 43 rotates, driven by the motor 40 and gearbox (not shown, but located within the motor unit), the rotation pushes the boom off the drum, up through the transition guide and out from the deployer. Deployment of the boom continues as the motor rotates the drum until an end-of-deployment condition is sensed by a sensor, as further described below.

The length/size of the deployer is dictated by a transition length of the boom, where the transition length is the distance required for the boom to be converted from the stowed flat shape on the deployer drum, to a fully formed C-shaped, box-shaped, or oval or oblong-shaped cross section. The box shaped boom, is sometimes referred to as a double omega design.

To stow an extended boom, the motor drives the drum in reverse and pulls the boom onto the drum through the transition guide and into a stowed state on the drum. During this stowing operation, design of the drum assembly (in particular the self-adjusting feature) causes the boom to shift to its final position in which the longitudinal axis of the boom is parallel to the end cheeks 57 in FIG. 5. The end cheeks retain the boom in a centered position on the drum during deployment and stowing operations. The play or self-adjusting mechanism in the interface between the boom, the pillars 62, and the screw holes 64 allows the boom centering.

The motor torque requirements for deployment and stowing are defined by the size (e.g., flat width of the boom when stowed on the drum) and length of stowed boom. Although the material of the boom is flexible, the boom has significant stored energy when wrapped around the drum due to its folded condition, while the natural state of the boom when fully extended is a C-shaped cup or a box shape or an oblong shape. When released from the drum, the stored energy returns the boom to its original shape, even after it has been stowed in a wrapped flat configuration on the deployer drum for an extended period (e.g., weeks, months, or years).

This stored energy requires the application of a compressive restraining force on the boom to retain the boom on the drum at all times. The deployer motor must also supply sufficient torque to overcome the compressive force and thereby rotate the drum to deploy the boom.

As described elsewhere herein, the required torque is provided by the motor and gearbox (based on boom size and length). The torque can be adjusted during deployment and stowing by the deployer controller (e. g., a microprocessor) on the deployer controller board 22 based on sensor values as described herein.

To contain the energy of the boom when wrapped on the drum and adjust the torque during deployment and stowing, the deployer includes a flexible chain comprising a plurality of roller elements. The chain wraps around the stowed boom and four springs (according to one embodiment) apply the necessary containment or tension forces to the flexible chain, and these forces are transferred to the wound boom. The arrowheads 60 in FIG. 4 represent these applied forces. These forces retain the boom on the drum. During deployment the forces applied by the springs are adjustable as the drum rotates to deploy or stow the boom. A larger force is required for booms that are stiffer.

Figure 7:
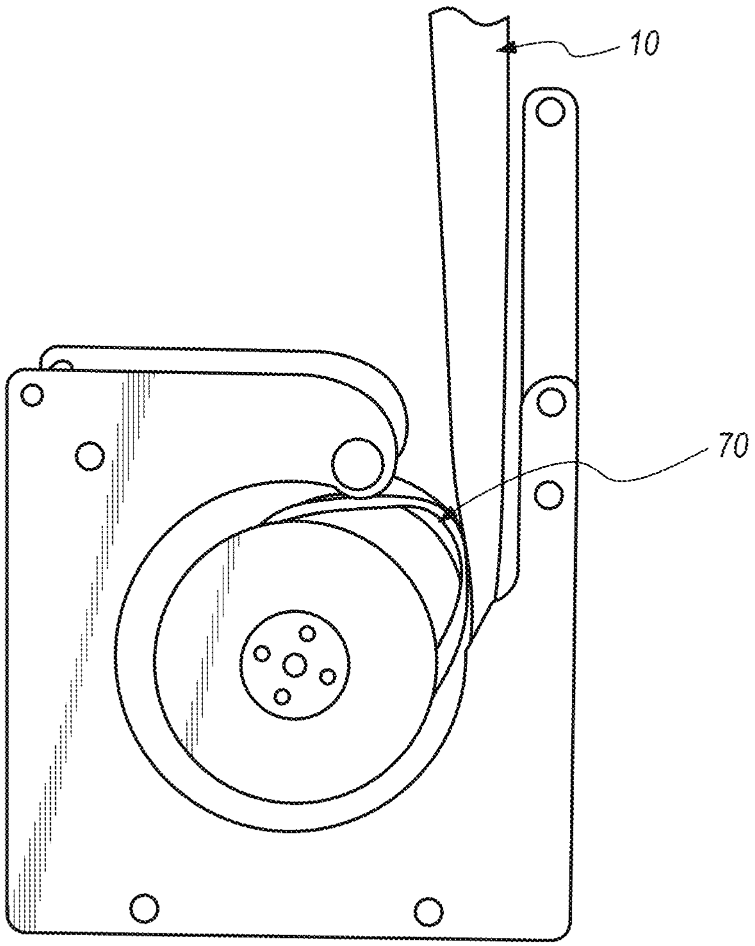
FIG. 7 illustrates a lower region of the deployer and blooming of the boom during deployment.

As the motor rotates the drum, the deploying force is applied to the wrapped boom by rotation of the drum by the motor. But without application of the containing or tension forces to the chain during deployment, the stored potential energy within the boom could push the boom to expand or unravel from the drum, rather than allowing the motor and drum combination to controllably push the end of the boom out from its wound condition and through the transition guide 20 of FIG. 3. This expansion of the boom, due to the stored forces, is referred to as boom blooming and illustrated in FIG. 7 by reference numeral 70. This blooming or unraveling of the boom must be controlled to ensure the boom is unwound controllably from the drum and does not unravel the boom from the drum.

Figure 8:
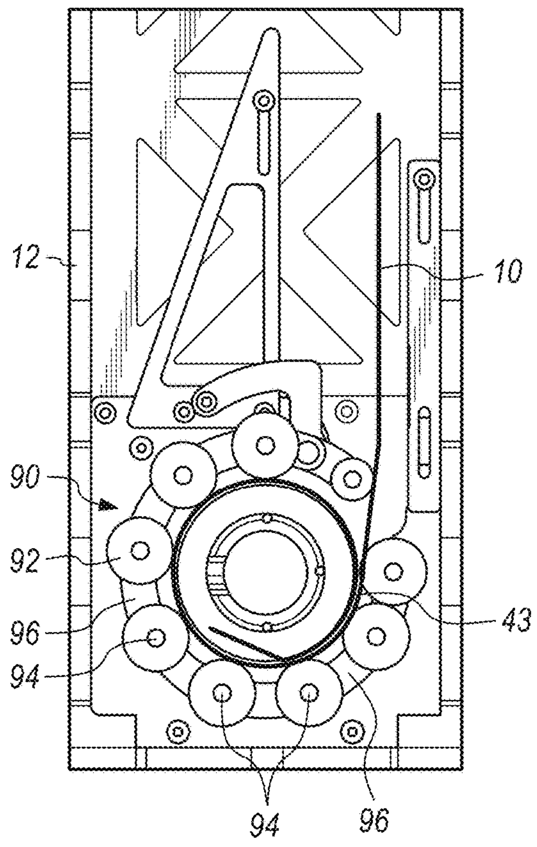
FIGS. 8 and 9 each illustrate a boom path during deployment and a boom tensioning mechanism.

To restrain the boom on the drum, a constraining or tension force is supplied by the chain, which comprises a plurality of rollers that are in contact with the boom as it resides on the drum. The chain and the plurality of linked rollers resembles a bicycle chain. See FIG. 8 illustrating a flexible tension chain 90 comprising a plurality of linked rollers 92 each rotatable about an axle 94 and linked to a neighbor roller via a link 96. As shown, the rollers are disposed in contact with the wrapped boom 10. The chain of rollers extends circumferentially around the folded boom for about 330 degrees.

As the drum is rotated by action of the motor, each roller rotates about its axle thereby allowing rotation of the drum and deployment of the boom. FIG. 8 illustrates the boom 10 deploying from the drum 43 and traveling upwardly within the deployer. The deploying boom eventually reaches the transition guide 20 of FIG. 2.

Figure 9:
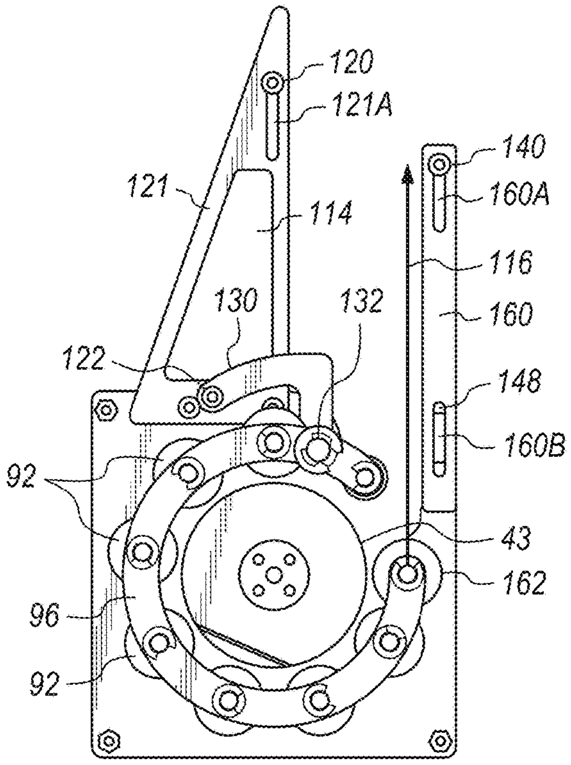

As depicted in FIG. 9, arrowheads 114 and 116 represent the constraining forces applied by the chain on the wound boom.

One such force is applied between a moveable anchor point 120 that moves within a slot 121A of a frame 121 and a point 122 on a cantilevered link 130. An anchor point 132 on the cantilevered link 130 is attached to the linked chain. The constraining force 114 is controlled (increased or decreased) by vertical adjustment of the moveable anchor point 120 within the slot 121.

Figure 11:
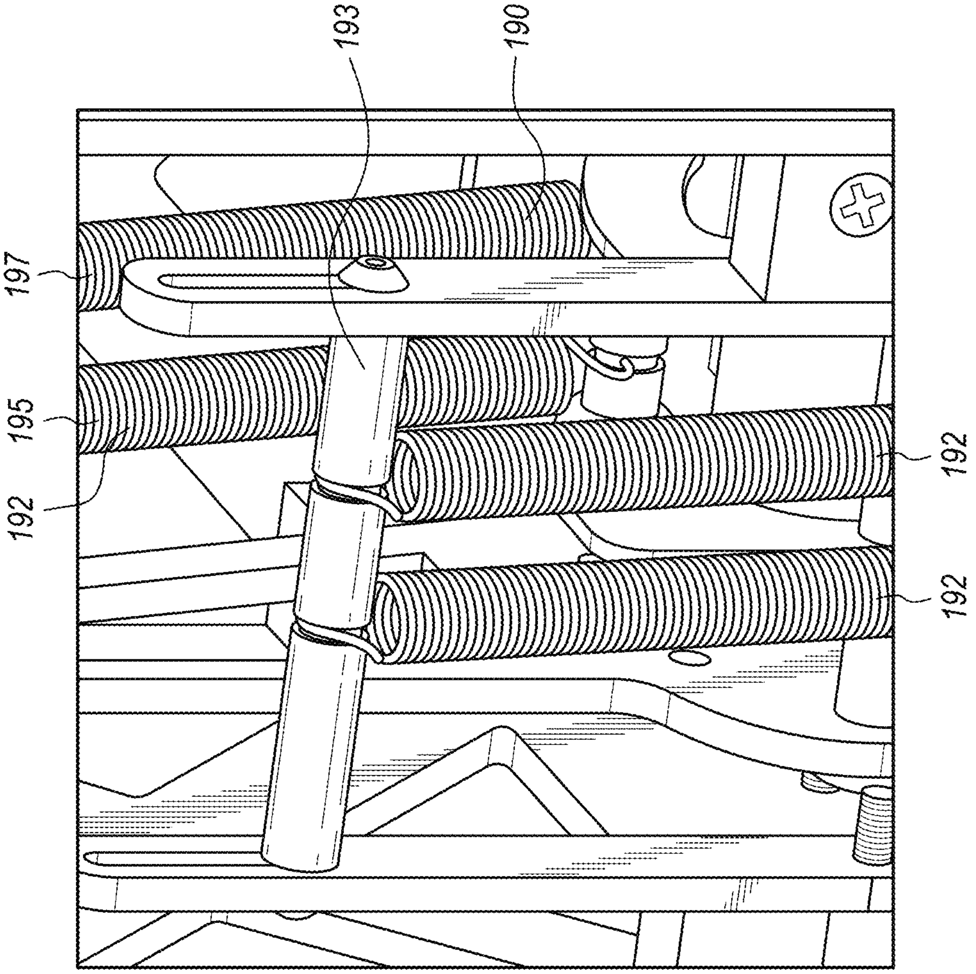
FIG. 11 illustrates roller tension springs associated with the boom tensioning mechanism.

Deployer elements 120, 121, 121A, 122, and 130 and 132 (see FIG. 9) are disposed on a near side of the deployer and duplicated on a far side of the deployer (not illustrated). Thus, a first end of a first rod is attached at the anchor point 120 and extends to an identical anchor point on the far side of the deployer where the second end of the first rod is attached. Similarly, a first end of a second rod is attached to the point 122 and a second end of the second rod is attached to an identical point on the far side of the deployer. Two parallel springs 190 and 192 (see FIG. 11) are disposed between a first rod 193 and a second rod (not shown). By movement of the anchor point 120 within the slot 121A the spring tension is adjusted and the force represented by arrowhead 114 is increased or decreased.

If the tension force is increased on the cantilevered link 130 the point 132 is moved toward the wound boom/drum thereby increasing the radially-directed forces exerted by all the rollers 92 on the wound boom/drum. If the tension force is decreased, the linked chain 92 moves away from the wound boom/drum, thereby decreasing the radially directed forces on the wound boom/drum. Thus, varying the forces applied to the link 130 controls the radially-directed forces exerted on the wound boom/drum and eliminates boom blooming. This force also relates to the torque on the drum.

The constraining force represented by the arrowhead 116 (see FIG. 9) is applied between a moveable anchor point 140 that moves within a slot 160A of a vertical bar 160 and a roller 162 The vertical bar 160 is also anchored by an anchor point 148 that moves within a slot 160B as the vertical bar is moved up or down. The constraining force 116 is controlled (increased or decreased) by vertical adjustment of the vertical bar 160 within the slots 160A and 160B.

Deployer elements 140, 160A, 148, 160B, and 160, are disposed on a near side of the deployer and duplicated on a far side of the deployer (not illustrated). Thus, a first end of a third rod is attached at the anchor point 140 and extends to an identical anchor point on the far side of the deployer where the second end of the first rod is attached. Similarly, a first end of a fourth rod is attached to the roller 162 and a second end of the fourth rod is attached to an identical point on the far side of the deployer. Two springs 195 and 197 (see FIG. 11) are disposed between the third and fourth rods (not shown). By movement of the anchor point 140 within the slot 142 the spring tension is adjusted and the force represented by arrowhead 116 is increased or decreased.

If the tension force is increased, the point 162 is moved toward the wound boom/drum thereby increasing the radially inward directed forces exerted by all the flexible tension chain 90 on the wound boom/drum. If the tension force is decreased, the linked chain 90 moves away from the wound boom/drum, thereby decreasing the radially directed forces on the wound boom/drum. Thus, varying the forces applied to the point 162 controls the radially inward directed forces exerted on the wound boom/drum and eliminates boom blooming by the components associated with the vertical bar 160.

Generally, more tension on the wound boom is required for booms that contain more stored energy i.e. a thicker boom or a closed cross section boom.

The tension force applied by the tension chain 90 is adjusted by moving the first rod within the slot 121A and/or moving the third rod within the slot 160A. The rods are then tightened using screws/washers/nuts during assembly.

The adjustable tension can accommodate a range of boom sizes and lengths. The rollers 92 are manufactured from Teflon® (a register red trademark of Chemours (formally DuPont) of Wilmington, DE) or another material that is compatible with operation and out gassing requirements in the vacuum of space.

A roller 116 in FIG. 9 also limits unwrapping or blooming of the boom from the drum at the point before it moves vertically into the transition guide, which is not visible in FIG. 9

Figure 10:
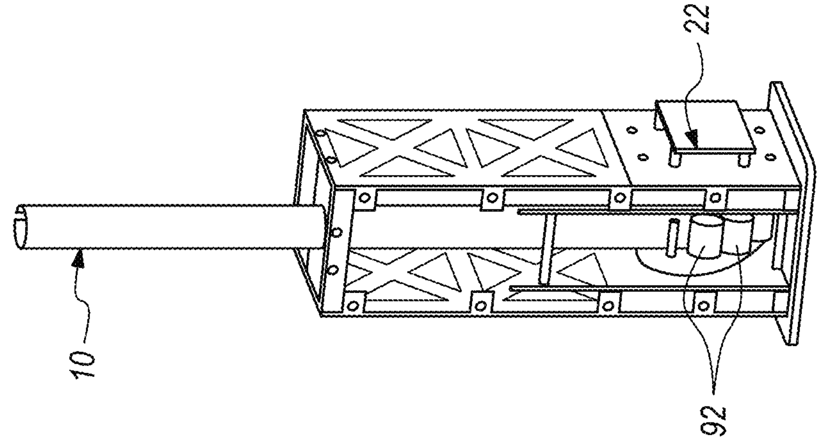
FIG. 10 illustrates the deployer and flexible rollers of the boom tensioning mechanism of FIGS. 8 and 9.

FIG. 10 illustrates the deployer 12 with a back panel removed to expose rollers 92.

The controller also activates an automatic tensioning sequence at the end of deployment. When the boom reaches the end of deployment, as determined by the length of the boom, antenna, or sensors, the motor tensions the boom, which causes an increase in motor current as measured by the motor current sensor. When a current peak is detected, deployment is terminated by operation of the microprocessor on the motor controller board. The specific current value that triggers end of deployment and tensioning is configurable in the software that controls the deployer. The trigger current is proportional to the tension required at full deployment and that value is determined for each specific application/deployment of the boom.

Deployer Sensors

One embodiment of the present invention employs threes groups of sensors for proper and controlled operation of the boom deployer. The three sensors are as follows:

- Infrared sensors (one or more sensors) monitor boom deployment by tracking drum rotation. The sensors are located on the IR printed circuit board 14 as illustrated in FIG. 1. The sensors are proximate the drum and thus can track drum rotation. If the drum count stops advancing this indicates that the drum is no longer rotating.
- A Hall Effect sensor tracks motor rotation; this sensor is located on the rear of the motor.
- A power supply current sensor for measuring motor current draw during deployment and stowing; this sensor is located on the main control printed circuit board. See FIG. 2, element 22. A maximum current value (which is predetermined according to the size, shape, and other physical characteristics of the boom) is determined and stored in memory for access by controller software. Responsive to the current reaching this predetermined value, the controller temporarily pauses deployment (referred to as a safety stop). This feature protects the deployer, boom, etc. from damage. If the anomaly persists for a predetermined time, the deployer awaits commands from a ground-based user.

Alternatively, or in addition to the safety stop, the measured current is reported in a health and status telemetry data stream (serial in one embodiment) transmitted from the satellite to a ground operator periodically or in response to a request.

All sensor measurements are reported to the deployer controller board 22 (see FIG. 2) which controls drum rotation and thereby progress of the deployment or stowing operation.

This data is also reported from the deployer controller to an onboard satellite controller. The information may in turn be transmitted to ground personnel to provide general situational awareness as to the status of the deployer and progress of the stowing or deployment operation.

Information as to the state of the antenna and sensors is always available to ground personnel, e.g., during deployment, stowing and when idle. The controller also indicates when the fully deployed state is reached and when the stowing operation has been completed. The fully deployed state is achieved when the current peak has been detected. Secondary confirmation of the fully deployed state ins indicated when the drum has stopped rotating, when the drum count is no longer advancing. The drum count is sent in the telemetry stream to the ground personnel.

The boom also supports several sensors, but these sensors are related to the mission of the satellite and not related to control of the boom deployment and stowage.

Deployer Integrated Control Operation

The deployer of the present invention presents an integrated design that can both deploy the boom and can also retract, or stow, the boom from a partial or fully deployed state, if required. The deployer and its constituent components are controlled and monitored electronically with an integrated microprocessor mounted on the deployer control board 22 shown in FIG. 2.

The design of the deployer assembly allows for operation in the presence of gravity, without any assistance. While the deployer is intended for use in space applications, and thus zero gravity, this does allow for bench testing of the unit without special considerations such as off-loading requirements. The deployer can be operated in the presence of gravity with an antenna or sensor integrated, or without an antenna or sensor integrated.

The deployer controller provides fully autonomous closed-loop feedback control during deployment and stowing. To begin deployment, a start signal is sent to the deployer FROM WHAT after which the controller monitors motor current and progress of the deployment operation. As the boom reaches full extension, the deployer senses the end of deployment, and locks the boom in its fully deployed state, thereby placing the antennas and sensors in their desired positions.

Features of the Invention

1. A deployer for deploying or stowing a boom to which are attached various sensors and attachments.
2. A satellite boom deployer mechanism that can be used with any length of composite or metal booms of circular, semicircular, square or oblong cross section.
3. The deployer mechanical assembly, the stowed boom and the control and monitoring electronics are mounted and enclosed in a single mechanical structure.
4. The composite or metal boom is stowed and deployed from one drum that is driven by a single motor.
5. The composite or metal boom has a tendency to expand from the drum when driven with a pushing force from the center of drum on which it is wrapped. The expansion is also known as ‘blooming’. This expansion is controlled, and compensated for by an adjustable tension chain control mechanism that prevents this phenomenon from occurring at any time throughout deployment.
6. The deployer provides autonomous operation to full deployment of the boom upon receiving an electrical start signal.
7. The deployer can pull the boom back onto the stow drum and stow it there even after partially or fully deployed.
8. The integrated electronics provides real-time digital telemetry of the operational status of boom deployment.
9. The deployer mechanical housing provides expansion space for the stowed boom to transition from its flat, stowed configuration, to a fully formed C-shaped, box cross-sectional shape or oblong cross-sectional shape before exiting the deployer housing.
10. The deployer can be used with a range of booms with a C-shaped, known as ‘slit tubes’ or ‘tape springs’ or with booms with a box shape or ‘double omega’ forms. The C-shaped booms may have an enclosed angle, from 0 degrees to 90 degrees. The enclosed angle is the angle through which the boom material curves, where a 0 degrees enclosed angle is a full circle with a slit at the opening and a 180 degrees enclosed angle is a semi-circle.
11. The deployer can be used with booms made from composite and metal materials.
12. The boom attachment point at the drum allows for small movement of the boom relative to the drum, providing a self-straightening capability.
13. The deployer can operate, without degradation of performance, in the presence of earth gravity for ground testing or in zero gravity once in orbit.

What is claimed is:

1. A deplover for storing and deploying a boom, the deployer comprising:

a motor;

a drum having a circular cross section, the boom stowe a stowed cross sectional configuration and wrapped around the drum, a first end of the boom attached to the drum:

the motor attached to the drum for rotating the drum;

a tensioning mechanism for applying radially inward directed forces on the folded and wrapped boom while the motor rotates the drum for deploying the boom from the deployer, wherein the radially inward directed forces limit blooming of the boom during deployment from the deplover, and wherein the tensioning mechanism comprises a chain disposed in circumferential contact with the folded and wrapped boom, the chain further comprising a plurality of links, each link rotatably attached to a next and to a prior link in the chain, the links for increasing or decreasing a magnitude of the radially inward directed forces.

2. The deployer of claim 1, further comprising a transition guide disposed at a location after the boom leaves the drum, wherein the transition guide defines an opening therein through which the boom passes, and wherein a shape of the opening transitions the boom from the stowed cross-sectional shape to a deployed cross-sectional shape.

3. The deployer of claim 2, wherein the deployed cross-sectional shape comprises one of a C-shaped cross-section, a rectangular cross-section, and an oblong cross-section.

4. The deployer of claim 1, wherein the motor is disposed within the drum, and wherein a motor shaft extension extends into a hollow protrusion extending from the drum, and wherein the motor shaft is received within and coupled to the hollow protrusion, such that the motor shaft and the hollow protrusion are concentric and rotation of the motor shaft extension rotates the drum.

5. The deployer of claim 4, further comprising a sleeve encircling the motor, the drum encircling the sleeve, further comprising bearings disposed between the sleeve and the drum such that the drum rotates around the sleeve.

6. The deployer of claim 5, wherein the sleeve is rigidly attached to a deployer structural member and the motor is rigidly attached to the sleeve.

7. The deployer of claim 1, further comprising a sensor for determining a status of boom deployment and wherein boom deployment is controlled responsive to the sensor.

8. The deployer of claim 1, wherein the magnitude of the radially inward directed forces is determined according to physical characteristics and material properties of the boom.

9. The deployer of claim 1, wherein the chain encircles about 330 degrees of the folded and wrapped boom.

10. The deployer of claim 9, wherein about 30 degrees separates first and second open ends of the chain, and wherein the magnitude of the radially inward directed forces are controlled by applying forces to the first and second open ends.

11. The deployer of claim 1, wherein the drum further comprises a primary drum component, a secondary drum component, and a first and a second drum cheek, the secondary component for attaching to the primary component such that the drum presents the circular cross section, the first and second drum cheeks disposed on opposing circular faces of the drum for retaining the boom on the drum between the first and second drum cheeks, and wherein fasteners secure the secondary drum component to the primary drum component with the first end of the boom disposed between the primary drum component and the secondary drum component.

12. The deployer of claim 11, wherein the fasteners extend through first openings in the secondary drum component and second openings in the first end of the boom and are threadably engaged with third openings in the primary drum component, wherein the second openings are oversized relative to a diameter of the fasteners thereby allowing limited movement of the boom.

13. The deployer of claim 1, further comprising a microprocessor for controlling boom deployment responsive to a plurality of sensors.

14. The deployer of claim 13, wherein the plurality of sensors comprises an infrared sensor for monitoring boom deployment by tracking drum rotation, a motor sensor for tracking motor rotation, and a power supply current sensor for measuring motor current.

15. The deployer of claim 14, wherein motor rotation is halted responsive to a measured motor current value reaching or exceeding a predetermined maximum motor current value.

16. The deployer of claim 15, wherein the predetermined measured motor current value is relayed to ground-based personnel.

17. A deployer for storing and deploying a boom, the deployer comprising:

a motor;

a drum having a circular cross section, the boom stowed in a stowed cross-sectional configuration and wrapped around the drum, a first end of the boom attached to the drum such that the boom enjoys limited movement relative to the drum;

a motor shaft coupled to the drum for rotating the drum;

a sleeve encircling the motor, the drum encircling the sleeve, the sleeve rigidly attached to a deployer structural member, the motor rigidly attached to the sleeve;

bearings disposed between the sleeve and the drum such that the drum rotates around the sleeve;

a transition guide disposed at a location after the boom leaves the drum, wherein the transition guide defines an opening therein through which the boom passes, and wherein a shape of the opening transitions the boom from the stowed cross-sectional shape to a deployed cross-sectional shape;

a tensioning mechanism for applying radially inward directed forces on the folded and wrapped boom while the motor rotates the drum for deploying the boom from the deployer, wherein the tensioning mechanism comprises a chain disposed in circumferential contact with the folded and wrapped boom, the chain further comprising a plurality of links, each link rotatably attached to a next and to a prior link in the chain, the links for increasing or decreasing a magnitude of the radially inward directed forces, and wherein the radially inward forces limit blooming of the boom during deployment from the deployer:

sensors for tracking drum deployment, motor rotation, and motor current; and a microprocessor for controlling boom deployment responsive to the sensors.

18. A satellite for receiving the deployer of claim 1, wherein the boom extends for extending-from the satellite and for supporting supports sensors or antennas operative with the satellite.

* * * * *